Patented May 19, 1936

2,041,343

UNITED STATES PATENT OFFICE 2,041,343

METHOD OF CHANGING THE GRAIN STRUCTURE OF METALS

Claude J. Holslag, South Orange, N. J., assignor, by mesne assignments, to President and Directors of The Manhattan Company, New York, N. Y., a corporation of New York No Drawing. Application March 23, 1933, Serial No. 662,595

1 Claim. (Cl. 219—11)

This invention relates to a method of changing the grain structure of metals and involves the use of a metal electrode having a special covering thereon whereby the electrode is necessary in carrying out the method as hereinafter set forth.

In welding operations where a number of layers are applied, one on top of the other, as in welding two pieces of metal together by the usual V type of weld, the underneath layers are annealed more or less by the succeeding layers of metal applied by the welding electrode, but the last layer is left in a hardened state and under more or less of a strain differing from the layer immediately beneath it. In single layer welds, that is to say, where only a single bead layer is applied, this is usually harder and of a different grain structure and under a greater tension than the parent metal adjacent the weld.

It is the object of my present invention to normalize the grain structure of this outer layer of welding material and thereby relieve the strains therein without changing the grain structure of the parent metal adjacent the weld; or at least to bring the grain structure of the parent metal and the applied welded material as near together as possible, as the last layer of a weld is left, in what I term, an incomplete state.

Another object of my invention is to smooth out the ripples of the last weld so as to present a smoother surface and appearance, and also to leave over the weld, under certain conditions, a coating which is highly protective both chemically and mechanically.

While in some cases, a gas flame or carbon arc may be used to normalize the outer layer of welding material, this process is too slow as it will not bring up the temperature of the outer layer quickly enough, and besides, the gas or arc flame in striking the material, spreads too much and anneals or changes the grain structure of the parent metal adjacent the weld, and this spreading property is particularly objectionable on a single bead weld, as the gas or arc flame cannot be made to track properly on such a weld; in addition, a carbon arc tends to harden the outer layer rather than anneal or normalize it.

I have discovered, after many tests, that for certain classes of work; for example including, but not by way of limitation, inclined, vertical or overhead welds, I can use, in this normalizing process, the coated electrode shown and described in my Patent 1,321,309, issued November 11, 1919, but to get a still better result, I have applied an additional outer coating to the coating disclosed in said patent; that is to say, I take an electrode coated as shown in Figure 3 of said patent, and then apply to this coating an additional outer coating of magnesium silicate and asbestos flour which are mixed together with water to the right consistency, whereby the coating may be applied by brushing, dipping, or some other method.

This type of outer coating, being tough and strong, serves at least two purposes:

First, it reduces or prevents oxidation of the oxygen-carrying compound; for example, manganese dioxide which I prefer to use because of its cheapness, and thereby keeps the ingredients of the original covering intact chemically and mechanically over a long period of time.

Secondly, this outer applied coating provides the ingredients which leave, over the treated surface, a tough yet elastic covering which prevents oxidation of the metal, as well as a mechanical finish.

In carrying out my method of normalizing the grain structure of the weld, it is to be understood that the size of the metal electrode and the current density through it are co-ordinated, so that the metal of the electrode is completely consumed in the arc which is struck and played over the surface, or drawn along the bead that is to be smoothed and normalized, with very little or no deposition on the weld, and the tremendous heat of the arc under the above conditions acts to quickly raise the temperature of the last layer or the single bead to a normalizing temperature, without spreading to any extent into the parent metal; and I have found that where this method is applied as above set forth, the weld is rendered much stronger, its looks greatly improved, and it is altogether a much improved weld.

I have also found that this electrode can be used to anneal a piece of metal whereby it can be readily bent along the line followed by the arc. For example, if it is desired to bend or break a piece of flat steel, an arc is struck with one of my improved electrodes as above described and drawn across the steel without laying down any bead, although a slight bead is not objectionable when the piece is to be bent or broken along this line, which can then readily be done. Where it is not desired to have any covering left over the material operated on, the special coating which I have described may be omitted and the electrode of my patent used for the purpose by co-ordinating the size of electrode and current so that the electrode is completely consumed in the operation, without laying down any bead or adding any appreciable amount of metal to the surface operated upon.

It is possible in inclined, vertical or overhead welding to secure normalizing of the outer layer or layers of the weld by using an electrode having an altogether different coating than herein described, by making the current through the electrode sufficiently large to vaporize the electrode at the arc and manipulate it so any metal, from the electrode condensing on the weld, merely falls off without being deposited thereon.

I prefer to use a completely coated electrode as has been described in preference to the scheme shown in Figure 5 of said patent, for the reason that air or oxygen coming through a hollow electrode tends to blow the arc to one side, and it therefore does not function as well as a coating applied in some manner to the outer surface of the electrode.

Having thus described my invention, what I claim is:

The method of treating welds which includes providing an electrode adapted to liberate oxygen and yield an inert non-oxidizing compound at high temperatures, connecting the weld to be treated and said electrode in circuit, energizing said circuit with current of a density sufficient to strike an arc between said weld and electrode and to effect substantial consumption of said electrode without metallic deposition, striking said arc and thereafter normalizing the weld by the heat thereof, sponsoring consumption of any residual metallic deposition by the oxygen liberated from said arc, and depositing from said electrode said inert non-oxidizing compound upon the normalized zone of the weld.

CLAUDE J. HOLSLAG.